(12) United States Patent
Carlson et al.

(10) Patent No.: US 10,010,057 B2
(45) Date of Patent: Jul. 3, 2018

(54) BIRD FEEDER ASSEMBLY

(71) Applicants: Brent J. Carlson, Watertown, WI (US); Debra L. Carlson, Watertown, WI (US)

(72) Inventors: Brent J. Carlson, Watertown, WI (US); Debra L. Carlson, Watertown, WI (US)

( * ) Notice: Subject to any disclaimer, the term of this patent is extended or adjusted under 35 U.S.C. 154(b) by 66 days.

(21) Appl. No.: 14/820,843

(22) Filed: Aug. 7, 2015

(65) Prior Publication Data

US 2017/0035032 A1 Feb. 9, 2017

(51) Int. Cl.
*A01K 39/01* (2006.01)
*A01K 39/014* (2006.01)

(52) U.S. Cl.
CPC ............ *A01K 39/014* (2013.01); *A01K 39/01* (2013.01)

(58) Field of Classification Search
CPC .............................. A01K 39/01; A01K 39/014
USPC ................................................. 119/52.2, 57.8
See application file for complete search history.

(56) References Cited

U.S. PATENT DOCUMENTS

| | | | | |
|---|---|---|---|---|
| 2,017,265 A * | 10/1935 | Tracy | ................... | A01K 5/0233 119/61.31 |
| 2,709,986 A * | 6/1955 | Soltan | ................... | A01K 39/014 119/57.8 |
| 3,253,576 A * | 5/1966 | Tvedten | ............... | A01K 39/014 119/51.03 |
| 3,602,196 A * | 8/1971 | Tucci | ................... | A01K 39/012 119/429 |
| 3,828,373 A * | 8/1974 | Fraley | ...................... | A47K 1/02 248/156 |
| 3,995,796 A * | 12/1976 | Kline | ........................ | A45F 3/44 248/121 |
| 4,261,294 A * | 4/1981 | Bescherer | .......... | A01K 39/0206 119/57.8 |
| 5,195,460 A * | 3/1993 | Loken | .................. | A01K 39/012 119/52.3 |
| 5,381,758 A * | 1/1995 | Simon | .................... | A01K 31/12 108/156 |
| 5,632,230 A * | 5/1997 | Dornetta | ................ | A01K 31/12 119/537 |
| 5,819,689 A * | 10/1998 | Simon | ................... | A01K 39/014 119/537 |
| 5,893,335 A * | 4/1999 | Goodwin | ........... | A01K 39/0113 119/52.2 |
| 6,386,142 B1 * | 5/2002 | Holscher | ................ | A01K 31/12 119/51.01 |
| 6,463,884 B1 * | 10/2002 | Lien | ........................ | A01K 31/04 119/468 |

(Continued)

*Primary Examiner* — David J Parsley
(74) *Attorney, Agent, or Firm* — Joseph S. Heino; James E. Lowe, Jr.; Erin E. Kaprelian

(57) ABSTRACT

A bird feeder assembly has a substantially horizontal plate that can be mounted to the uppermost inverted U-shaped curved portion of a typical shepherd's hook. The plate comprises a plurality of apertures in it. Several of the apertures are used to fasten the plate to the hook. Several more apertures can be used to support feeding cups within them. The cups are preferably made of a material that is easy to clean. Several more apertures are provided to allow a perch point along the plate such that feeding birds can wrap their feet around a portion of the plate. An alternative embodiment provides a support member such that the assembly can be attached to the vertical portion of the shepherd's hook.

1 Claim, 4 Drawing Sheets

(56) References Cited

U.S. PATENT DOCUMENTS

| | | | |
|---|---|---|---|
| 6,588,723 B1 | 7/2003 | Moran, III | |
| 8,336,837 B2 * | 12/2012 | Gephart | F16B 2/12 248/218.4 |
| 8,807,514 B1 * | 8/2014 | Giauque | A01K 39/02 248/156 |

* cited by examiner

BIRD FEEDER ASSEMBLY

FIELD OF THE INVENTION

This invention relates generally to bird feeder assemblies. More specifically, this invention relates to a bird feeder assembly that can be easily attached as an add-on item to a shepherd's hook of the type that is used to support suspended flower pots and other decorative items from a portion of the hook.

BACKGROUND OF THE INVENTION

The use of bird feeder assemblies is well known. Such feeder assemblies come in many shapes and configurations and are used to provide conventional feed to birds. In the experience of this inventor, many other foods can be used to attract specific bird species. For example, jelly and orange halves can be used to attract orioles and purple finches. Meal worms can be used to attract blue birds. Other non-traditional foods can be used as well, including other fresh fruits, eggs and egg shells, cereal, cheese, pastas and rice. Such foods are not well suited, however, for conventional gravity-fed bird feeder assemblies.

In the experience of this inventor, other conventional bird feeder assemblies are typically configured to be mounted to the top of a post or hung from any number of stationary objects including tree limbs, roof overhangs, and the like. Conventional bird feeder assemblies can even be hung from shepherd's hooks of the type that are used in yards and gardens to suspend a wide variety of decorative items from the hook, although the height of the hook may not be practical due to other raiders of such feeders including squirrels, raccoons and the like.

A typical shepherd's hook includes a relatively long and upright staff. At a bottom end of the staff is a secondary structure for securing the hook in the ground. At a top end is an inverted U-shaped portion which leads to a smaller U-shaped portion. The smaller U-shaped portion is used to hang any number of items from it in a decorative fashion. One example of such a hook is illustrated in U.S. Pat. No. 6,588,723 to Moran, Ill.

In the experience of this inventor, however, no use of the inverted U-shaped portion of the shepherd's hook has been used for mounting a bird feeder assembly to it in a way that does not require the modification or alteration of the shepherd's hook structure.

Accordingly, it is an object of the present invention to provide a new and useful bird feeder assembly that can be used as a complementary functional and decorative item when attached to the uppermost inverted U-shaped curved portion, or apex, of a typical shepherd's hook or, alternatively, to the vertical portion of the typical shepherd's hook. It is another object of the present invention to provide such an assembly that can be quickly and easily attached to the shepherd's hook and that is aesthetically pleasing. It is yet another object of the present invention to provide such a bird feeder assembly that is easy to refill with bird food including conventional bird food such as seeds as well as non-conventional bird food such as mealworms, fruit and the like, to attract different species of birds to the assembly.

SUMMARY OF THE INVENTION

The assembly of the present invention has obtained these objects. It provides for a bird feeder assembly having a substantially horizontal plate that can be mounted to the uppermost inverted U-shaped curved portion, or apex, of a typical shepherd's hook. The plate comprises a plurality of apertures in it. Several of the apertures are used to fasten the plate to the hook by means of a U-shaped bolt, a clamp plate and a plurality of fasteners. Several more apertures can be used to support feeding cups within them. The cups are preferably made of a material that is easy to clean which is particularly important when the bird feeder assembly is used with jellies, fruits, eggs and egg shells, cheese, pastas and rice, as alluded to earlier. Lastly, several more apertures are provided to allow a foot-hold or "perch point" along the plate such that feeding birds can wrap their feet around a portion of the plate as they feed. An alternative attachment means is also provided such that the assembly can be supported at the vertical portion of the shepherd's hook.

The foregoing and other features of the bird feeder assembly of the present invention will be apparent from the detailed description that follows.

DETAILED DESCRIPTION

Figure 1:
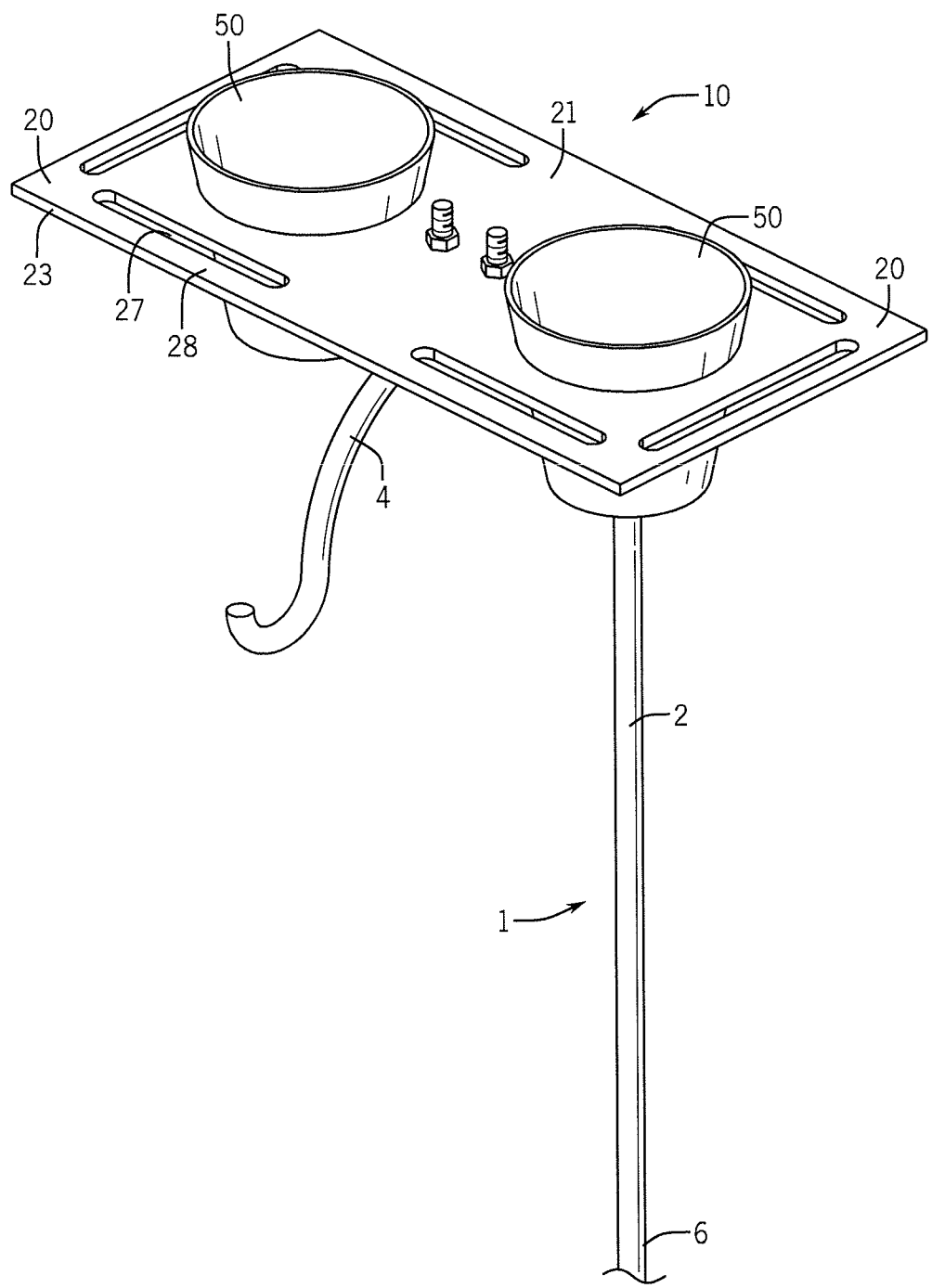
FIG. 1 is a bird feeder assembly constructed in accordance with the present invention and showing the assembly attached to one point of a shepherd's hook.
Figure 2:
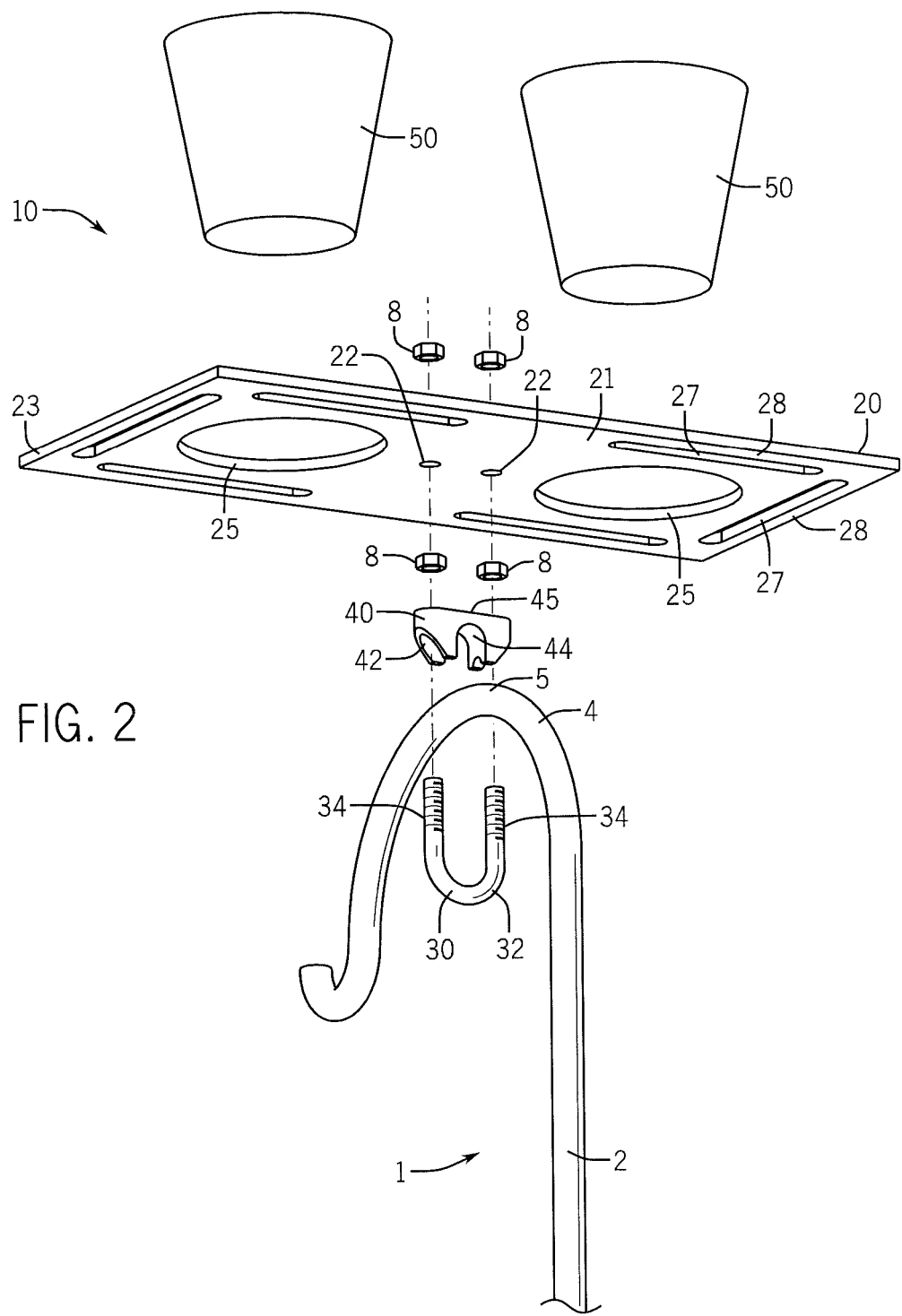
FIG. 2 is an exploded view of the assembly shown in FIG. 1.

Referring now to the drawings in detail wherein like numbers represent like elements throughout, FIGS. 1 and 2 illustrate a bird feeder assembly, generally identified 10, that is constructed in accordance with the present invention.

The shepherd's hook 1 comprises a vertical pole-like portion 2 having an upper portion 4, an uppermost portion, or apex 5, and a lower portion 6, a part of the lower portion 6 being inserted into the ground to maintain the hook 1 in a generally upright position.

FIG. 1 shows that the feeder assembly 10 comprises a plate member 20, means for securing the plate member 20 to the inverted and curved U-shaped upper portion 4 of a shepherd's hook 1, and a pair of food cups 50, although the assembly 10 is not limited to just two such cups 50. The plate attachment means comprises a U-bolt 30, a clamp plate 40 and a plurality of fasteners 8. In the preferred embodiment, the U-bolt 30 comprises a lower-most U-shaped portion 32 and a pair of upwardly-extending and externally threaded ends 34. The external threads of the ends 34 are complementary to the internal threads (not shown) of the fasteners 8. It is to be noted, however, that the fastening means as described here could also comprise other fastener structures such as the U-bolt ends 34 having opposing or circumferential slots (not shown) formed in them and the fasteners being C-style or E-style retaining rings (also not shown) that fit into the slots. Alternatively, the fasteners 8 could be wing nuts. Other variants are within the scope of the present invention. The retaining means used, however, is preferably removable.

The clamp plate 40 comprises a first U-shaped bottom channel 42 within which the lower-most U-shaped portion 32 of the U-bolt 30 is received. The clamp plate 40 further comprises a second U-shaped bottom channel 34 within which the upper-most portion 4 of the shepherd's hook 1 is received. When positioned within the clamp plate 40, the lower-most U-shaped portion 32 of the U-bolt 30 and the upper-most portion 4 of the shepherd's hook 1 cross one another substantially perpendicularly. The clamp plate 40 further comprises a substantially flat top surface 45. This top surface 45 provides a point upon which a portion of the plate member 20 is supported.

Figure 3:
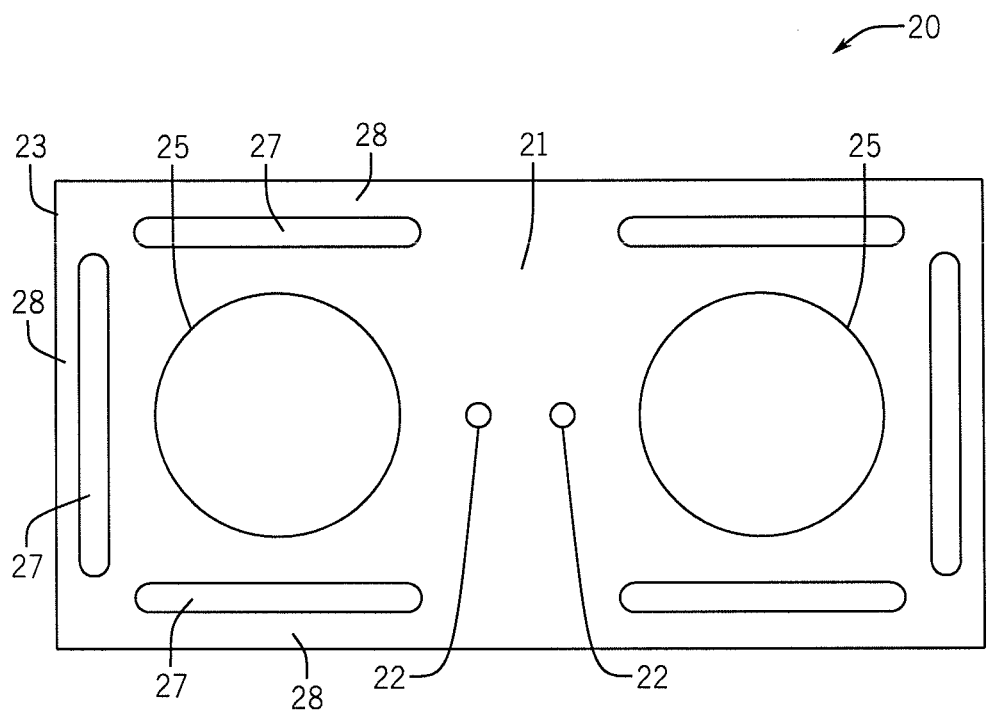
FIG. 3 is a top plan view of the plate in the assembly of the present invention.

As shown in FIG. 3, it will be appreciated that the plate member 20 is a planar piece of material, having a thickness and having a perimeter. As shown, the plate member 20 is configured as having a rectangular shape having a central portion 21 and an outer edge 23. Disposed within the plate member 20 is a pair of small round apertures 22, a pair of larger round apertures 25 and several slot-like apertures 27. The small round apertures 22 are used to receive the ends 34 of the U-bolt 30 in them. The larger round apertures 25 are used to receive and serve as a means for supporting a pair of food cups 50 in them. The slot-like apertures 27 are positioned in close proximity to the outer edge 23 of the plate member 20 so as to provide a small length 28 of plate member 20 that may be used as a foot-hold or perch by a feeding bird. It is to be understood that the present invention is not limited to the rectangular shape shown or to the number of cup apertures 25 disclosed or to the number or placement of the slot-like apertures 27.

Figure 4:
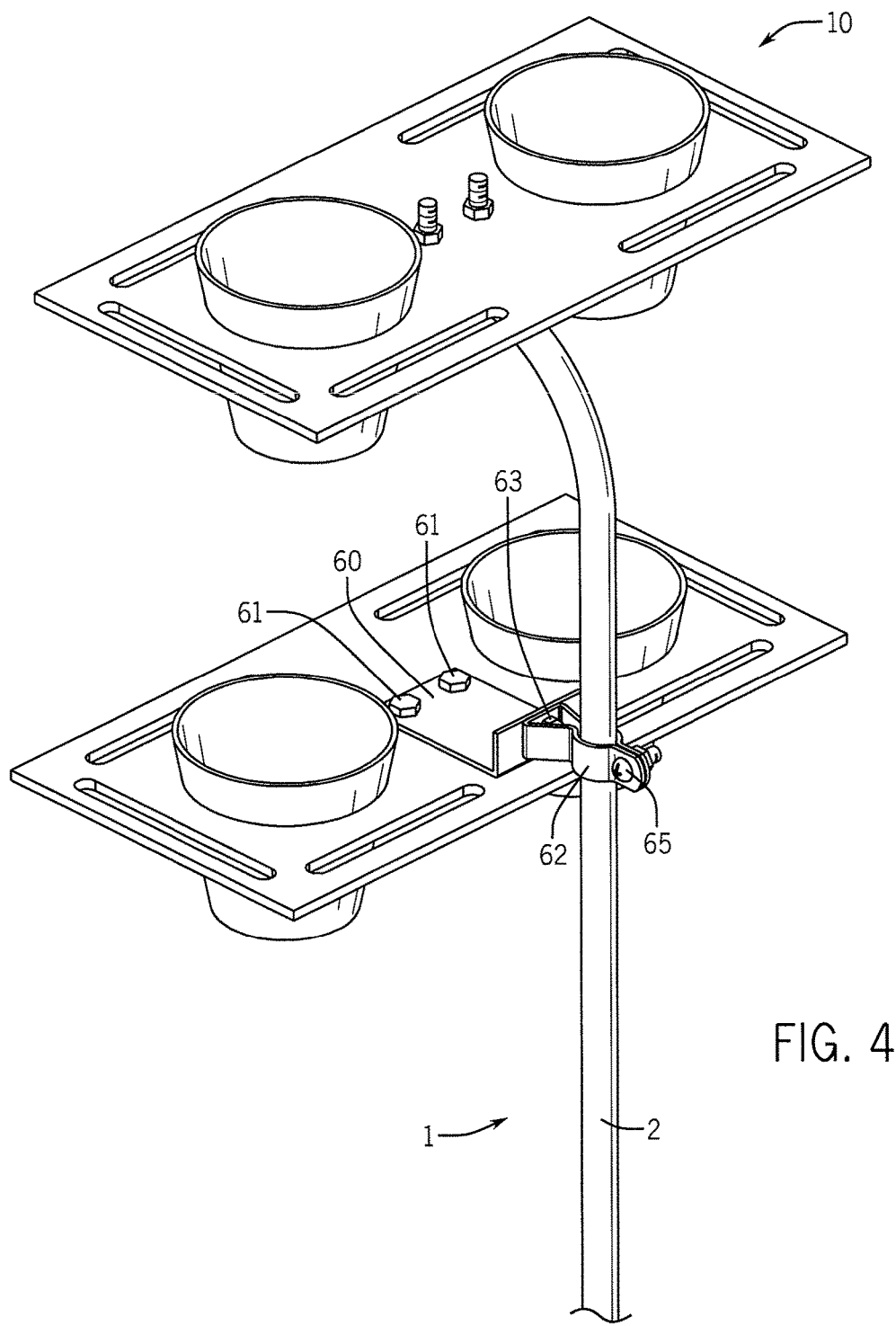
FIG. 4 is perspective view of the assembly of the present invention and showing the assembly attached to another point of a shepherd's hook.

In an alternative embodiment, as is shown in FIG. 4, the assembly 10 can be alternatively secured to the vertical portion 2 of the shepherd's hook 1. Specifically, the plate member 20 is still configured to have a rectangular shape with a central portion 21 and an outer edge 23. In this alternative attachment, the pair of small round apertures 22 that are disposed within the plate member 20 are used with a securing means that comprises a plate attachment bracket 60, a hook attachment bracket 62 and a plurality of fasteners 61, 63, 65. In this configuration, the small round apertures 22 are used to receive the fasteners 61, the brackets 60, 62 are secured together via another fastener 63 and the hook attachment bracket 62 is attached to the vertical portion 2 of the shepherd's hook 1. It is also possible to use more than one of the assemblies 10 with a single shepherd's hook.

The details of the invention having been disclosed in accordance with the foregoing, I claim:

1. A bird feeder assembly for use with a shepherd's hook, the shepherd's hook having a vertical pole-like portion and a curved U-shaped upper portion, the U-shaped upper portion being inverted and comprising an apex, the assembly consisting of:
   a planar plate member, wherein:
      the planar plate member lays in a substantially horizontal plane;
      the planar plate member has an outer edge that forms a plate member perimeter; and
      the planar plate member further has a pair of substantially circular apertures defined in the plate member;
   a threaded U-bolt, a clamp plate, and a pair of fasteners that secure the plate member to the apex of the shepherd's hook in a horizontal plane;
   a plurality of slot-like apertures defined at the plate member perimeter and positioned in close proximity to the outer edge of the plate member to provide a foot-hold or perch for a feeding bird;
   two food cup apertures defined in the planar plate member; and
   two food cups, one placed within each of the food cup apertures.

* * * * *